United States Patent [19]

Mesnard et al.

[11] Patent Number: 4,633,713
[45] Date of Patent: Jan. 6, 1987

[54] INSERT/RETRACT MECHANISM FOR FLOW MEASUREMENT PROBES

[75] Inventors: David R. Mesnard, Boulder; Horst W. Kalin, Longmont, both of Colo.

[73] Assignee: Dieterich Standard Corp., Boulder, Colo.

[21] Appl. No.: 768,829

[22] Filed: Aug. 23, 1985

[51] Int. Cl.[4] .............................................. G01F 15/00
[52] U.S. Cl. ...................................... 73/866.5; 73/198
[58] Field of Search ................ 73/432 B, 432 R, 201, 73/198, 861.65, 861.66, 861.67

[56] References Cited

U.S. PATENT DOCUMENTS

| | | | |
|---|---|---|---|
| 1,485,831 | 3/1924 | Cole | 73/201 X |
| 3,025,464 | 3/1962 | Bond | 73/432 B X |
| 3,296,859 | 1/1967 | Stewart | 73/201 |
| 4,327,586 | 5/1982 | Goddard | 73/432 B |
| 4,537,071 | 8/1985 | Waterman | 73/432 B |

FOREIGN PATENT DOCUMENTS 75618  6/1980  Japan .................. 73/432 B

OTHER PUBLICATIONS

Annubar Flow Measurement Catalogue; Cover Page and pp. 3, 8, 11, 14, and 20; by Jun. 1986.
Eastech Product Description; cover page entitled "VS-2100 Series Flowmeter" and p. 9; by Jun. 1986.

Primary Examiner—Michael J. Tokar
Assistant Examiner—Tom Noland
Attorney, Agent, or Firm—Edwin L. Spangler, Jr.

[57] ABSTRACT

This invention relates to a manually-operated mechanism for inserting and removing flow measurement probes and the like from a pipeline carrying a flowing fluid, such mechanism being characterized by a hanger subassembly including a yoke mounted atop the probe for movement therewith externally of the pipe along with a pair of threaded rods suspended non-rotatably from the yoke and which parallel one another as well as the longitudinal axis of the probe but on opposite sides thereof, a drive subassembly supported in fixed position beneath the yoke and including a common drive shaft along with a pair of worm gear trains each containing a worm gear threaded onto one of the threaded rods, such drive subassembly operatively interconnecting the shaft and the two threaded rods for simultaneously and synchronously raising or lowering the latter, and a handcrank for turning the drive shaft.

7 Claims, 4 Drawing Figures

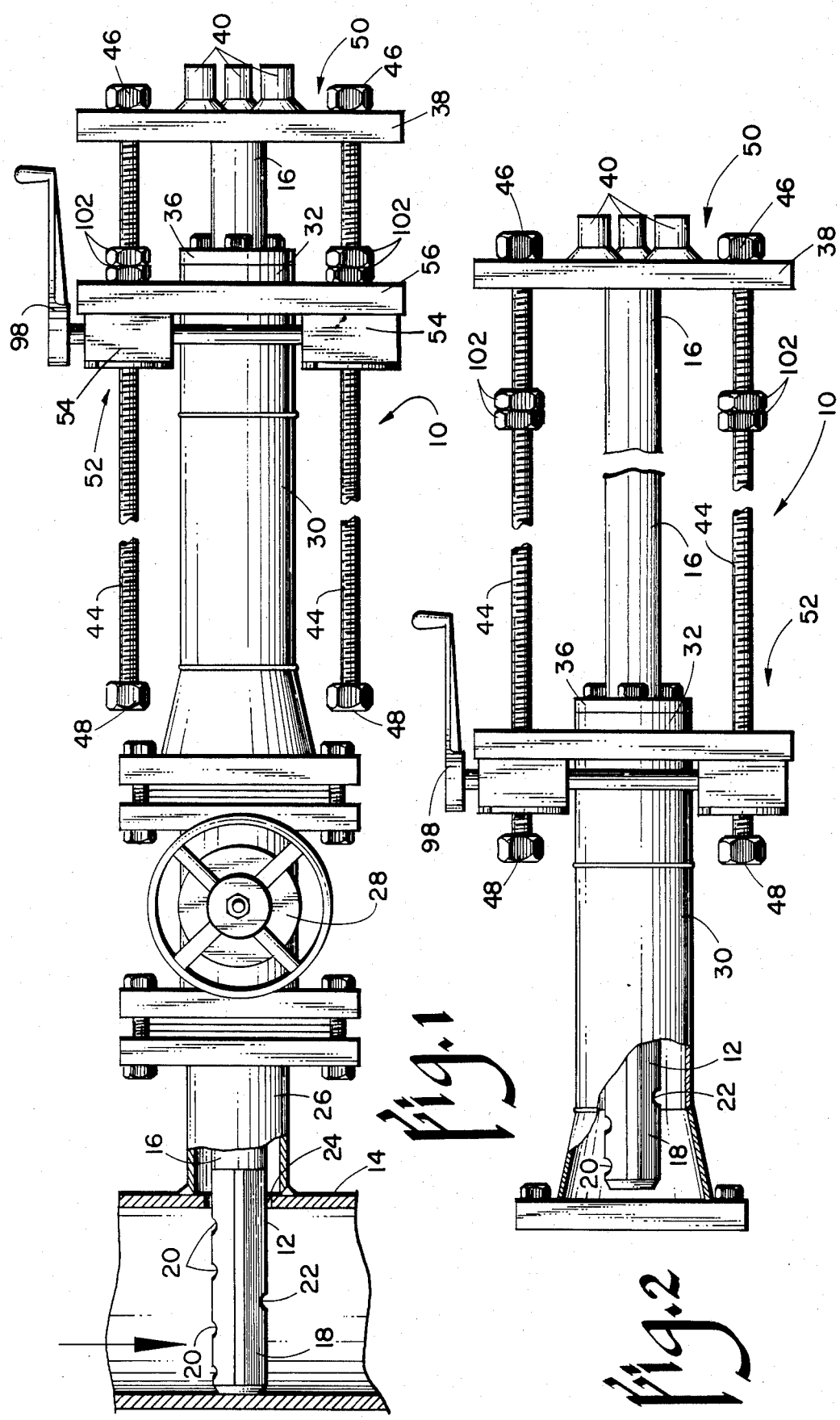

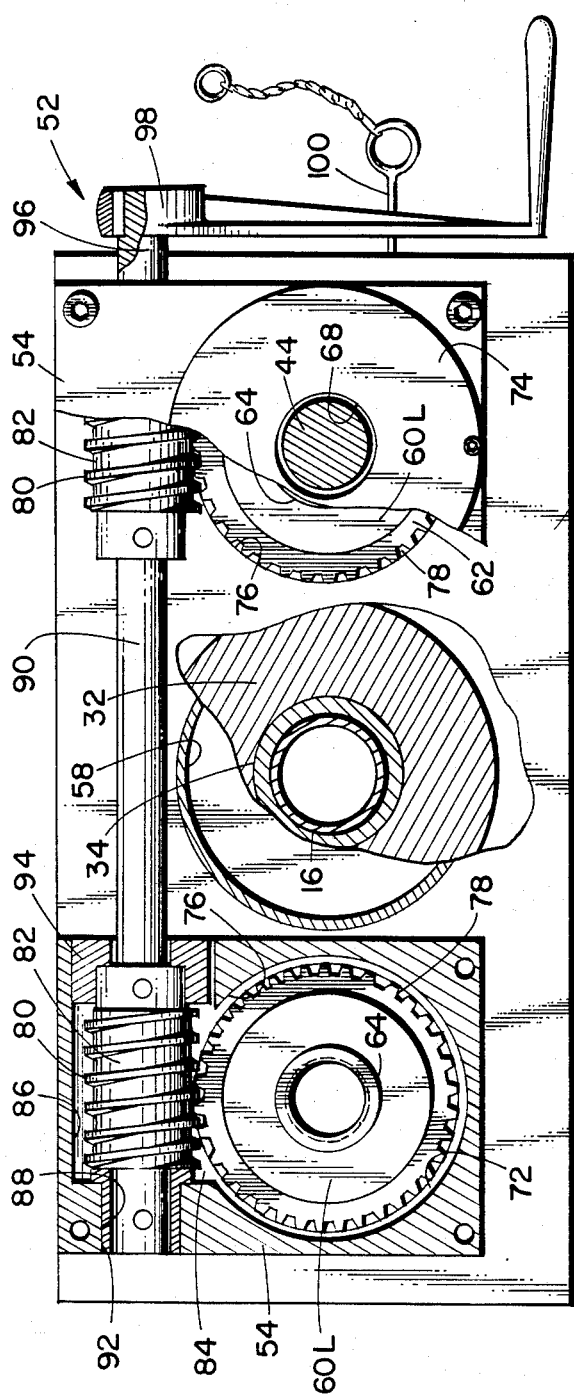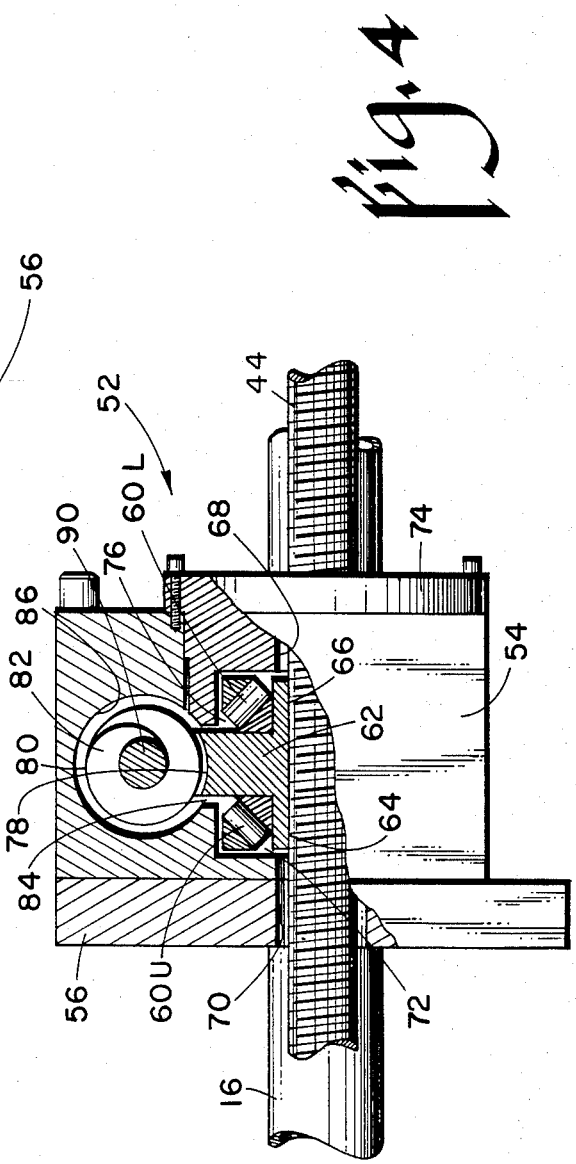

INSERT/RETRACT MECHANISM FOR FLOW MEASUREMENT PROBES

BACKGROUND OF THE INVENTION

Pitot tube type flow measurement devices insertable into a fluid flowing within a pipe comprise commonplace instruments for measuring flow. Differential pressure measurements constitute the data from which the flow rate can be calculated and, since these measurements are taken internally but read out externally, it is necessary that the probe be provided with an external fluid-tight mounting of some type attached to the pipe. Such mountings are also well known in the art and may, for example, include shut-off valves such that the fluid entering the mounting can be contained while the probe is removed altogether. Other situations exist where the probe must be retracted to a position outside the pipe so as to not obstruct the latter yet remain attached thereto by means of the mounting. One such situation is that in which the pipe is to be cleaned by running a so-called "pig" through it. Obviously, the presence of a probe in its extended operative position would make such an operation impossible.

Applicants and others have, over the years, developed a number of different systems for inserting and withdrawing probes of the type mentioned above. One of the most common systems for accomplishing this task is to attach the probe to a piston and use compressed air or a fluid to reciprocate the piston pneumatically or hydraulically. While such systems have the capability of being designed for actuation from a remote location, to do so becomes expensive and is hardly worth the price when the occasion for its use arises so infrequently. Moreover, and most important, is the fact that such systems are unreliable and if they fail for some reason which they often do, then not only is the probe damaged but the pipeline is plugged. Accordingly, applicants have found that, because the only safe course to follow is to monitor the probe-withdrawal operation on site anyway, all the expensive sophistication is surplusage for the most part and it is, therefore, considered far better to provide a simple manually-operated insert/retract mechanism which can be relied upon to withdraw the probe as well as provide a visual indication that it has, in fact, been removed. The design of such a mechanism is not, however, without its problems.

Among these problems is the fact that extreme care must be exercised so as to not damage the probe or the fluid-tight seal that permits it to be reciprocated without leaking fluid or causing a loss in line pressure. Also, considerable attention has to be given to the fact that one must limit the excursion of the probe in both directions or, otherwise, it can be crushed by striking the remote pipe wall as it is inserted or pulled out past the packing that seals it within its mounting. Last, but by no means least, is the necessity for insuring that the insert/retract mechanism employed is capable of resisting the sometimes considerable line pressure acting to expel it.

SUMMARY OF THE INVENTION

Applicants have now found in accordance with the teaching of the instant invention that these and other objectives can, in fact, be realized by the novel, yet unobvious, expedient of non-rotatably mounting a pair of threaded rods on opposite sides of the probe for movement therewith in parallel relation thereto and using a pair of gear trains which remain fixed with respect to such rods and the probe and which are operated off a common drive shaft to turn gears threadedly attached to the rods simultaneously and synchronously in the same direction thus screwing the latter up and down so as to accomplish the desired reciprocal movement of the probe without the danger of cocking it off axis. Opposed stops on the rods and the fixed support carrying the gear trains limit the excursion of the probe to that which avoids damage thereto or its withdrawal from the seal therefor. The shallow pitch of the threads on the threaded rods insures the fact that the probe connected thereto will not back out of its mounting under the influence of high line pressures.

It is, therefore, the principal object of the present invention to provide a novel and improved manually-actuated mechanical system for inserting and retracting a flow measurement probe from within a pipeline.

A second objective is the provision of a system of the class described which is so designed that it insures the axial movement of the probe thus protecting it from damage as well as the fluid-tight seal within which it reciprocates.

Another object of the invention herein disclosed and claimed is to provide a flow measurement probe insert/retract system which is safe against blowouts.

Still another objective of the within-described invention is that of providing a mechanical apparatus for accomplishing limited reciprocating movement of a pitot tube type flow meter which is either directly connectable to the usual mountings therefor or can be made so with but minor modifications.

An additional object is to produce an insert/retract system for flow measurement probes that provides a direct visual indication of the position thereof relative to the pipe containing the flowing fluid.

Further objects are to provide a mounting for reciprocating a flow measurement probe between its operative position inside a pipe and its inoperative position located externally thereof which is simple, relatively inexpensive, easy to operate, rugged, reliable, capable of precise control over the movements of the probe, virtually trouble free and even somewhat decorative.

Other objects will be in part apparent and in part pointed out specifically hereinafter in connection with the description of the drawings that follows, and in which:

BRIEF DESCRIPTION OF THE DRAWINGS

FIG. 1 is a side elevation, portions of which have been broken away and shown in section, while others have been broken away to conserve space showing the flow measurement probe insert/retract mechanism mounted atop a conventional mounting for the probe and with the latter extended into its fully operative position;

FIG. 2 is a side elevation similar to FIG. 1 and to the same scale showing the probe withdrawn from the pipe into its fully retracted position by means of the insert/retract mechanism, the valve seen in FIG. 1 along with the pipe and lower parts of the mounting having been eliminated while, once again, breaking away certain portions and sectioning others;

FIG. 3 is a horizontal view to a greatly enlarged scale showing the underside of the drive subassembly for the threaded rods, some portions having been broken away and shown in section while others have been broken away to more clearly reveal the interior construction; and, FIG. 4 is a side elevation of the drive subassembly to the same scale as FIG. 3 with portions of the gear case broken away to more clearly reveal the drive train.

DESCRIPTION OF THE PREFERRED EMBODIMENTS

Referring next to the drawings for a detailed description of the present invention and, initially, to FIGS. 1 and 2 for this purpose, reference numeral 10 has been selected to designate in a general way the manually-operated mechanical assembly for inserting and retracting a flow measurement probe 12 of conventional design from inside a pipe 14. In the particular form illustrated, the probe has a cylindrical body portion 16 which remains outside the confines of the pipe and a shaped portion 18 having a generally diamond-shaped cross section that extends diametrically across the pipe when in the fully inserted position shown in FIG. 1. It is the latter shaped portion 18 which contains the upstream-facing ports 20 that are impacted by the flowing fluid within the pipe. These ports along with a downstream-facing port 22 lying in the wake of the flowing fluid provide the differential pressure readings necessary to calculate the flow. The probe enters the pipe through an opening 24 in its wall. A conventional flanged collar 26 is welded to the pipe in surrounding relation to the aforesaid opening. Bolted to the flange of the latter is a shut-off valve 28 which, with the probe fully retracted into the position shown in FIG. 2, can be actuated to close off opening 24 into the pipe thus permitting the probe and its associated insert/retract assembly 10 to be removed. A flanged riser tube 30 of a length adapted to receive and house the shaped body portion 18 of the probe in fully retracted position above the valve 28 is bolted to the latter in sealed relation. Atop the riser tube is mounted a seal housing 32 containing a pocket filled with packing 34 (FIG. 3) that surrounds and provides a fluid-tight seal around the cylindrical body portion 16 of the probe. This same cylindrical body portion exits the seal housing 32 through a central opening (not shown) in its cap 36. This seal housing and the packing contained therein seal off opening 24 into the pipe when the valve 28 is open regardless of whether the probe is inserted or retracted.

All of the above-described hardware is conventional and no useful purpose would be served by discussing it in greater detail. Moreover, various alternative sealable mountings could be substituted for the one shown which would be fully compatible with the insert/retract assembly which is where the novelty lies. It is sufficient to point out that this hardware enables the probe to be inserted into the pipe and retracted therefrom or removed altogether without losing any fluid. As previously noted, occasions arise not infrequently in which the pipe must be cleared of all obstacles and the present invention is directed to a manually-actuated mechanical assembly for carrying out this necessary procedure.

All four figures of the drawing show the insert/retract assembly to which detailed reference will now be made. The cylindrical body portion of the probe that remains exposed above the seal housing 32 in both the inserted and retracted positions thereof seen in FIGS. 1 and 2 is fixedly attached to the underside of yoke member 38 which carries on top thereof the various fittings 40 that are connected through suitable passages (not shown) into the hollow interior of the probe. Two of these fittings, of course, provide the means by which the high and low pressure readings are taken externally while the third enables other incidental operations to be performed. Non-rotatably suspended from yoke member 38 are a pair of rods 44 carrying so-called "Acme" threads which lie in transversely-spaced parallel relation to one another and to the longitudinal axis of the probe, all three of the aforesaid elements reciprocating together. Rods 44 are shown as having cap nuts 46 on their upper ends and adjustable nuts 48 on their lower ends, the latter two defining stops limiting the upward travel of the hanger subassembly just described which has been indicated in a general way by reference numeral 50.

In a similar manner, the worm gear drive subassembly that is used to lift the probe free of the pipe and lower same down into the latter has been indicated broadly by reference numeral 52, the details of which are most clearly revealed in FIGS. 3 and 4. A pair of individual gear housings 54 are mounted upon and shown hung in suspended relation from the underside of a baseplate 56, the center of which is cut out as indicated at 58 to receive and be fixedly attached to the seal housing 32 which provides the support therefor. Inside each of these small gear housings is journalled for rotation between suitable upper and lower bearings 60U and 60L, respectively, a worm gear 62. The separate but nonetheless fixedly attached hub portions 64 of each such worm gear 62 are internally threaded as seen at 66 to mate with the Acme threads on the rods 44. It becomes self-evident, of course, that when these worm gears are simultaneously and synchronously rotated in the same direction about the non-rotatable threaded rods 44, the hanger subassembly 50 will go up and down thus retracting and inserting the probe.

Registering slightly oversized openings 68 and 70 in the gear housing 54 and the baseplate 56, respectively, are provided to pass the threaded rods 44 and can best be seen in FIG. 4. In addition, gear housings 54 each contain a cylindrical recess 72 sized to receive the gears 62. Similarly recessed coverplates 74 are threaded into each of the gear housings and are used to preload the bearings. Pockets 76 house both the gear 62 and its upper and lower bearings 60U and 60L.

The concave teeth 78 on the periphery of the two worm gears 62 mesh with the convex teeth 80 on worms 82 through passages 84 in each of the gear housings interconnecting the pockets 76 with intersecting pockets 86. These last-mentioned pockets house the worms 82 and comprise enlargements in a pair of bores 88 (FIG. 3) that are arranged in coaxially-aligned relation within the two gear housings 54. A single common drive shaft 90 is journalled for rotation within bushings 92 fitted in the remote end of each of the two bores 88. The adjacent ends of the worm pockets 86 are each provided with centrally-apertured bushings 94 which abut and journal the corresponding ends of the worms 82 that are fixedly attached to shaft 90 in axially-spaced relation to one another. The projecting end 96 of shaft 90 mounts a handcrank 98, the function of which, obviously, is to actuate the gear train and crank the probe in and out of the pipe. The pitch of the Acme threads on the rods 30 is so shallow that there is virtually no possibility of the probe being forced out of the pipe and into retracted position due to high pressure acting upon the shaped end 18 thereof; nevertheless, to insure that it remains in fully inserted or fully retracted position, a lockpin 100 is provided to releasably fasten the handcrank to some fixed portion of the drive subassembly 52 so that it cannot be accidentally turned. The drive subassembly just described operatively interconnects the two threaded rods together for simultaneous reciprocation to move the probe in and out of the pipe without it becoming cocked and damaged. The meshed worm gears, in addition to converting rotary to reciprocating motion, permit the use of the shallow-pitched Acme threaded rods that are highly resistant to axial loads, especially of the magnitude encountered in fluid pressure measurement.

Returning again briefly to FIGS. 1 and 2, cap nuts 48 are fixed on the lower ends of the threaded rods will engage the undersides of their respective gear housings 54 and thus prevent the probe from being withdrawn from the seal housing and the packing contained therein. Instead, the entire insert/retract assembly 10 should be demounted from the valve 28 after the probe has been retracted and the valve closed. Equally important, if not more so, are the locknut pairs 102 placed on each of the threaded rods in position to engage the top surface of baseplate 56 thereby limiting the excursion of the probe into the pipe to just that point at which it barely touches the remote wall. Since this is a blind operation to start with, the mechanical advantage offered by the Acme-threaded rods could easily damage, if not actually crush, the shaped end of the probe if no limit stop was provided.

What is claimed is:

1. An insert/retract mechanism for inserting and removing flow-measurement probes and the like axially into and out of a pipeline normal to the direction of fluid flow therein which comprises: a hanger subassembly including yoke-forming means attachable to the probe for movement therewith externally of the pipe and a pair of threaded rods suspended non-rotatably from said yoke in transversely-spaced parallel relation to one another and to the probe axis on opposite sides thereof; a drive subassembly supported in fixed position beneath the yoke and including a common drive shaft along with a pair of gear trains, each of said gear trains having a first gear threaded onto one of said threaded rods and a second gear mounted on said drive shaft for rotation therewith, each of said second gears being operatively interconnected to a first gear for rotating same upon rotation of the drive shaft, said drive subassembly operatively interconnecting said shaft and two threaded rods together for simultaneously and synchronously raising and lowering the latter together with a probe attached to the yoke-forming means and positioned therebetween; and means connected to the drive shaft for rotating same.

2. The insert/retract mechanism as set forth in claim 1 in which: the first and second gears of each gear train comprise worm gears journalled for rotation in meshed relation about skewed mutually-perpendicular axes of rotation.

3. The insert/retract mechanism as set forth in claim 1 in which: the pitch of the threads on the threaded connection between the threaded rods and the first gear is substantially less than the pitch of the threads interconnecting the first and second gears.

4. The insert/retract mechanism as set forth in claim 1 in which: the means for turning the drive shaft comprises a handcrank.

5. The insert/retract mechanism as set forth in claim 1 in which: first stop-forming means are carried by at least one of the rods positioned to engage the underside of the drive subassembly thereby limiting the excursion of the probe in the retract mode.

6. The insert/retract mechanism as set forth in claim 1 in which: second stop-forming means are carried by at least one of the rods positioned to engage the top of the drive subassembly thereby limiting the excursion of the probe in the insert mode.

7. The insert/retract mechanism as set forth in claim 4 in which: a lock pin releasably locks the handcrank non-rotatably to a fixed support.

* * * * *